Jan. 15, 1963    J. I. YELLOTT    3,072,920
SWIMMING POOL COVER FOR COLLECTION OR REFLECTION OF SOLAR HEAT
Filed July 23, 1959
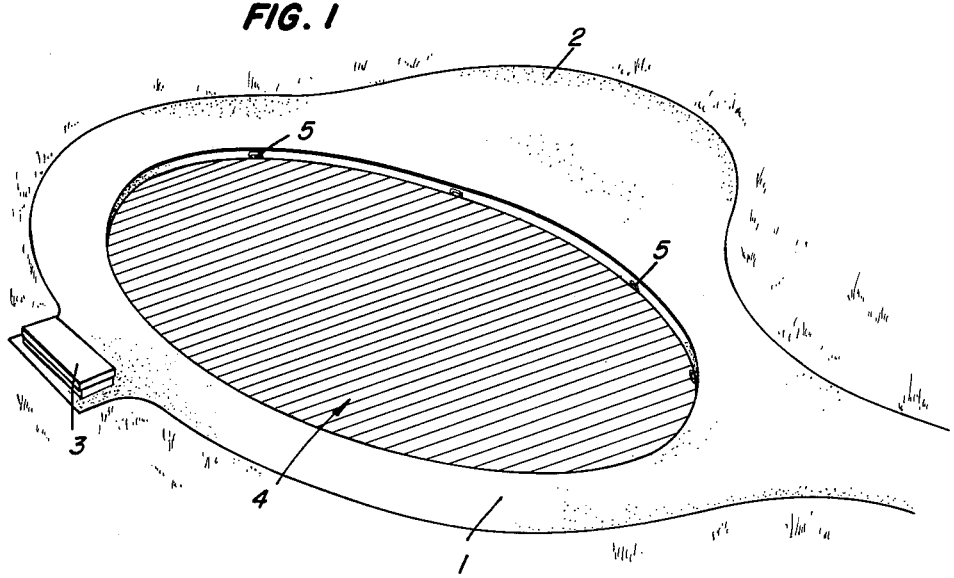
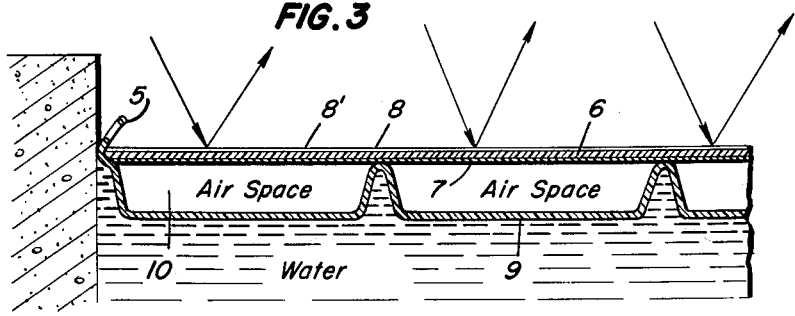
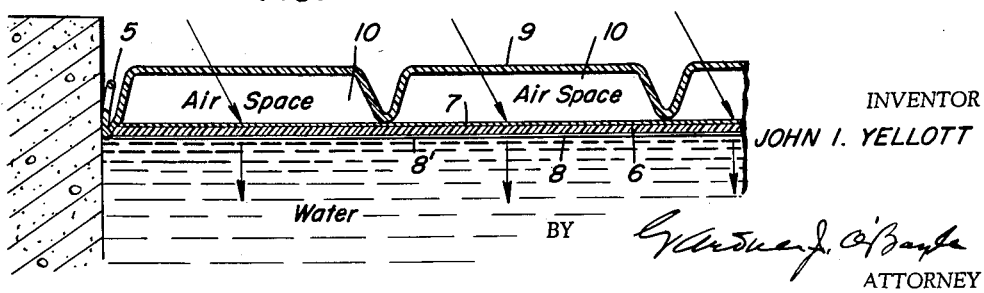
INVENTOR
JOHN I. YELLOTT

United States Patent Office 3,072,920
Patented Jan. 15, 1963

3,072,920
SWIMMING POOL COVER FOR COLLECTION OR REFLECTION OF SOLAR HEAT
John I. Yellott, 901 W. El Caminato, Phoenix, Ariz.
Filed July 23, 1959, Ser. No. 829,100
4 Claims. (Cl. 4—172)

This invention relates to covers for relatively small bodies of water, and more particularly to a cover for an outdoor swimming pool.

In accordance with the present invention, the improved cover arrangement is in the form of a pneumatic mattress, of substantially the same area as the surface of the water in the pool, and adapted to float thereon. The mattress comprises, essentially, a sheet of plastic material, particularly adapted to resist deterioration because of weather, and an over-layer of thin transparent plastic attached to one face of the sheet, the over-layer being folded at spaced intervals intermediate of its peripheral edge and heat sealed or otherwise secured to the sheet, whereby to form a plurality of pockets adapted to be filled with air. The exposed surface of the plastic sheet may be covered by a reflective surface, such as a thin layer of aluminum, and the opposite face of the sheet is covered by a dark-colored material, particularly adapted for the absorption of solar energy. The pocketed over-layer is of a thin transparent plastic of the type which is substantially completely transparent to solar rays, but is relatively opaque to the long waves which are radiated by low temperature surfaces.

In the summer, when it is desired to keep the pool both clean and cool, the mattress will be turned so that the dark, absorptive surface is down, facing the water and floating thereon, with the aluminized surface facing the sky, to reflect the sun's radiant energy therefrom, thus keeping the water in the pool relatively cool. Since the reflectance of the aluminized layer is so high that at least 90% of the incident heat is reflected, instead of being absorbed in the pool, and by reason of insulating air space between the upper layer and the water, the cover effectively maintains the temperature of the pool comfortably and pleasantly low.

In the winter, when it is desired to heat the pool, and also prevent dirt, dust and other foreign material from getting into the water, the cover is reversed so that its dark, upper absorptive surface is exposed to the solar energy. The transparent plastic over-layer acts as a heat trap, since the sun's rays pass through the over-layer and are absorbed by the dark surface of the plastic sheet. This surface, when exposed to intense solar radiation, is heated to a temperature which can readily approach 90 to 100 degrees, and the surface then re-radiates, but at a very long wave length. Accordingly, the material constituting the transparent over-layer will be selected so that it is relatively opaque to such rays, and thereby brings about the "green house" effect.

An object of my invention is to provide an improved cover for swimming pools and other bodies of water of relatively small area.

Another object of my invention is to provide an improved swimming pool cover designed for collection or reflection of solar heat.

Yet another object of my invention is to provide an improved cover for outdoor swimming pools adapted to float on the surface of the water in the pool, the cover being constructed and arranged whereby to reflect the sun's radiant energy and thus keep the water relatively cool and dark to prevent the growth of algae, or to heat the water by collecting solar heat.

Still another object of my invention is to provide an improved swimming pool cover adapted to prevent evaporation of water from the surface of the pool.

A still further object of my invention is to provide an improved swimming pool cover adapted for use in conjunction with solar heating apparatus.

Yet a still further object of my invention is to provide an improved swimming pool cover which is strong and rugged in construction, impervious to water, unaffected by the ultra-violet constituent of solar radiation, or by the oxygen of the atmosphere.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

FIGURE 1 is a perspective view of a swimming pool, showing a cover floating on the surface of the water in the pool;

FIG. 2 is a cross sectional view of the pool of FIG. 1;

FIG. 3 is an enlarged sectional view along a portion of the major axis of the cover of FIG. 1, showing the reflective surface of the cover exposed to the solar energy; and FIG. 4 is a view similar to FIG. 3, showing the cover in the inverted positon, with its absorptive surface exposed to solar energy.

Referring to the drawings, and more particularly to FIG. 1, there is shown an oval shaped pool, surrounded by a conventional concrete deck 1, including an apron or extension, designed to accommodate a support for a diving board, deck or lounging chairs, tables and other accessories, normally provided with an outdoor swimming pool. The pool itself is elevated above the surrounding lawn or terrain so that irrigation water will not be able to enter and contaminate the water in the pool, and at one side of the pool there is provided a small box-like structure 3, adapted to house a re-circulating pump, filter, and other equipment needed to keep the pool clean. The cover member of the present invention, designated generally by numeral 4, is of the same general configuration as the pool, and of substantially the same area as the surface of the water upon which it is adapted to float. Suitable handles, comprising flexible loop members 5, are attached to the cover at spaced intervals in the vicinity of the peripheral edge thereof, whereby the cover may be removed from the pool for the purpose of storing the same, or it may be lifted and inverted, for purposes to be described more fully hereinafter.

Referring to FIG. 3, the cover member 4, which is in the nature of a pneumatic mattress, comprises a sheet of plastic material 6, having its bottom surface covered with a layer of dark-colored material 7, particularly adapted for the absorption of solar energy, and having its upper surface covered by a reflective surface 8, such as a very thin layer of aluminum, said reflective surface being protected from the water by means of a laminated overlay 8′ of transparent, water and weather resistant, thin plastic film. An over-layer of thin transparent plastic material 9 is attached to the marginal edge of the plastic sheet 6, as by heat sealing, portions of the material 9 being folded at spaced intervals, as shown, and secured along the fold lines to sheet 6 by heat sealing or other means, to form a plurality of air-filled compartments or pockets 10, whereby to increase the buoyancy of the cover.

As indicated hereinbefore, the plastic over-layer 9 is of a type which is almost completely transparent to solar rays, but is relatively opaque to long waves which are radiated by low-temperature surfaces. There are several materials presently available which are completely impervious to water, which is an essential characteristic for the environment in which the material is used, and these materials are also unaffected by the ultraviolet constituent of solar radiation or by the oxygen of the atmosphere, and are inert with respect to the small concentration of chlorine maintained in some swimming pools to prevent the growth of algae. In this connection, the dark surface 7 of the cover, which is adapted for the absorption of solar energy, also insures the shutting off of light from the pool, which in turn will control the growth of algae, which is another important feature of the present invention.

There are several commercially available materials, having the properties referred to above, produced by the Du Pont Company under the trade names "Teslar," a polyvinyl fluoride; and "Mylar," a polyethylene terephthalate. The properties of these materials are described in an article by Frank Edlin of the Du Pont Company, which article appears in the April 1958 issue of Solar Energy, vol. 2, No. 2.

In the summer, the cover is permitted to remain on the pool when the pool is not in use. The aluminized layer reflects the sun's heat, and keeps the water relatively cool. It also prevents evaporation of the water, which is an important feature, for the reason that evaporation brings about or is the cause of a number of undesirable conditions, including (a) loss of water, with need for make-up and (b) increase of hardness of the water, since the substances dissolved therein, which constitute hardness, do not leave when the surface water evaporates, and thereby build up throughout the summer until it becomes necessary to empty the pool, with the attendant cost and waste of water.

The conventional method of cooling swimming pools in the summer is by spraying some of the water into the air, thus bringing about evaporative cooling. By reason of the high reflectance of the aluminized layer of the cover of the present invention, whereby at least 90% of the incident heat is reflected, rather than being absorbed in the pool, in conjunction with the insulating air space between the upper layer and the water, the cover will maintain the temperature of the pool comfortably low.

In the winter, when it is desired to heat the pool, as well as to keep it covered to prevent dirt or dust from getting into the water, the cover is inverted so that its dark, upper absorptive surface 7 is exposed to the solar energy. The transparent plastic over-layer 9 acts as a heat trap, since the sun's rays pass through the over-layer, to be absorbed by the dark surface.

An important effect accomplished by the cover is the prevention of evaporation from the surface of the pool. In areas where the relative humidity is low, the loss of heat occurs in three ways. About half of the heat is lost by evaporation, another 30% by radiation, and about 20% by convection. The use of the cover will eliminate the evaporation, considerably reduce the radiation, and also, because of the insulating effect of the dead air space between the two layers, loss by convection will be minimized.

While the cover has been described with air spaces or pockets defined by and between the plastic sheets or films, the invention comprehends the use of a suitable absorbent material in each of the pockets. The cover will then be in the form of a quilted black material between the plastic film layers. In this embodiment of the invention, the aluminum foil or coating will be applied to the under surface of sheet 6, instead of on its top surface, as shown in FIG. 4, thus protecting the foil from the water. The bottom and top sheets or films may be of transparent "Teslar" or "Mylar," and the spaces between the films may be filled with black wool such as "Dacron," a polyester fiber.

The operation of the modified cover is the same as the first described embodiment of the invention. For winter operation, the cover will float on the water, and effectively stop evaporation. It will also minimize radiation and convection heat loss, and will reduce the total heat loss to approximately ⅓ of the amount experienced by an uncovered pool. During the day, sunlight will pass through the transparent upper film or sheet, and heat the black filler material. This heat will be transmitted through the lower film, and into the water surface, the normal circulation in the pool being sufficient to mix the water to a point where a reasonably uniform temperature will prevail throughout the pool. For summer use the cover is inverted, so that the foil-clad sheet faces the sun. The aluminum foil reflects a large percentage of the sunlight, thereby minimizing the heat input to the pool. In addition, the insulating filling of "Dacron" will help to reduce the inflow of heat from the surrounding air into the pool.

It is intended that the cover will be used in conjunction with solar heating apparatus, the size of which can be reduced approximately 50% because of the heat-conserving action of the cover. Additionally, it is contemplated that the cover will be used with irrigation canals to prevent evaporation of water.

When the pool is not symmetrical, so that the cover may not simply be reversed or inverted, it may be formed of several segments arranged in such manner that the entire surface of the pool is covered.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A buoyant cover for a swmming pool, comprising a base sheet having one face covered with a material characterized by high absorption of solar radiation, a sheet of transparent material over-laying the absorptive surface, said sheet being secured to the base at spaced intervals and defining with said base a plurality of expanded pockets, the cover being in an operative floating position in a swimming pool with the pocketed over-layer exposed to the sun, whereby the absorptive surface is heated, and the heat trapped in the pockets is transmitted into the water surface.

2. A cover in accordance with claim 1, characterized by the fact that the base sheet is formed from a transparent plastic, and the pocketed over-layer comprises a thin sheet of plastic which is substantially completely transparent to solar rays and relatively opaque to the long waves radiated by low temperature surfaces.

3. A cover, comprising a base sheet having one face covered with a material characterized by high reflectance to solar energy, the opposite face of said sheet being covered with a material characterized by high absorption of solar energy, a sheet of transparent material over-laying the absorptive surface, said sheet being secured to the base at spaced intervals and defining with said base a plurality of expanded pockets, whereby when the reflective surface is exposed to the sun, a substantial portion of the radiant energy of the sun is reflected, and when the cover is reversed so as to expose the pocketed over-layer to the sun, the absorptive surface is heated, and the heat trapped in the pockets is transmitted through the high reflectance material.

4. A cover in accordance with claim 3, characterized by the fact that the base sheet is formed from a transparent plastic, the reflective surface is made of aluminum, the absorptive surface is formed from a radiation-absorptive plastic, and the pocketed over-layer comprises a thin sheet of plastic which is substantially completely transparent to solar rays and relatively opaque to long waves radiated by low temperature surfaces.

References Cited in the file of this patent

UNITED STATES PATENTS

| | | |
|---|---|---|
| 1,250,260 | Wilcox | Dec. 18, 1917 |
| 2,517,393 | Law | Aug. 1, 1950 |
| 2,580,555 | Kroeger | Jan. 1, 1952 |
| 2,660,736 | Biefeld | Dec. 1, 1953 |
| 2,715,231 | Marston | Aug. 16, 1955 |
| 2,863,179 | Gaugler | Dec. 9, 1958 |
| 2,867,346 | Champagnot | Jan. 6, 1959 |
| 2,896,272 | Latenser | July 28, 1959 |
| 3,022,781 | Andrassy | Feb. 27, 1962 |

FOREIGN PATENTS

| | | |
|---|---|---|
| 840,926 | France | Jan. 28, 1939 |
| 994,106 | France | Aug. 3, 1951 |
| 1,141,261 | France | Mar. 11, 1957 |

OTHER REFERENCES

"Solar Heating for Swimming Pools," by S. R. Robson, New Zealand Engineering, September 1956, pages 298 and 299.